(12) United States Patent
Won et al.

(10) Patent No.: US 9,099,727 B2
(45) Date of Patent: Aug. 4, 2015

(54) LEAD PLATE, BATTERY PACK HAVING THE SAME, AND METHOD OF MANUFACTURING THE BATTERY PACK

(71) Applicant: Samsung SDI Co., Ltd., Yongin, Gyeonggi-do (KR)

(72) Inventors: Hee-Youn Won, Yongin (KR); Dae-Yon Moon, Yongin (KR); Han-Jun Wang, Yongin (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 94 days.

(21) Appl. No.: 13/719,041

(22) Filed: Dec. 18, 2012

(65) Prior Publication Data

US 2014/0072859 A1    Mar. 13, 2014

(30) Foreign Application Priority Data

Sep. 13, 2012    (KR) .................. 10-2012-0101807

(51) Int. Cl.
| | | |
|---|---|---|
| H01M 10/04 | (2006.01) | |
| H01M 2/24 | (2006.01) | |
| H01M 2/20 | (2006.01) | |
| H01M 2/02 | (2006.01) | |

(52) U.S. Cl.
CPC .............. *H01M 2/24* (2013.01); *H01M 2/202* (2013.01); *H01M 2/204* (2013.01); *H01M 10/04* (2013.01); *H01M 2/0217* (2013.01)

(58) Field of Classification Search
CPC ...................... H01M 10/04; H01M 10/0459
USPC ........................................ 429/121, 185, 174
See application file for complete search history.

(56) References Cited

U.S. PATENT DOCUMENTS

| | | |
|---|---|---|
| 5,418,083 A | 5/1995 | Tamaki et al. |
| 5,578,392 A | 11/1996 | Kawamura |
| 2006/0073382 A1* | 4/2006 | Urano et al. .................. 429/161 |
| 2009/0154048 A1 | 6/2009 | Jang et al. |
| 2009/0208830 A1* | 8/2009 | Okabe et al. .................. 429/121 |

(Continued)

FOREIGN PATENT DOCUMENTS

| | | |
|---|---|---|
| JP | 2000-106170 | 4/2000 |
| JP | 2005-011629 A | 1/2005 |
| JP | 2006-278825 | 10/2006 |

(Continued)

OTHER PUBLICATIONS

Notice of Allowance dated Jul. 31, 2013 for corresponding KR Application No. 10-2012-0101807.

(Continued)

*Primary Examiner* — Stewart Fraser
*Assistant Examiner* — Olatunji Godo
(74) *Attorney, Agent, or Firm* — Knobbe Martens Olson & Bear LLP

(57) ABSTRACT

A lead plate that electrically connects a plurality of battery cells. The lead plate includes a first welding unit; a second welding unit separately disposed from the first welding unit by a slit between the first and second welding units; and a by-pass unit, an end of which is connected to the first welding unit and the other end of which is connected to the second welding unit, wherein the end of the by-pass unit is disposed on an opposite side of the slit based on the first welding unit, and the other end of the by-pass unit is disposed on an opposite side of the slit based on the second welding unit.

12 Claims, 5 Drawing Sheets

(56) References Cited

U.S. PATENT DOCUMENTS

2011/0117412 A1   5/2011   Park
2011/0281151 A1   11/2011  Lee

FOREIGN PATENT DOCUMENTS

| KR | 10-2001-0010341 | 2/2001 |
| KR | 10-2009-0064961 | 6/2009 |
| KR | 10-2011-0054662 | 5/2011 |

OTHER PUBLICATIONS

Extended European Search Report dated Feb. 4, 2014 for European Patent Application No. EP 13 160 007.4 which shares priority of Korean Patent Application No. KR 10-2012-0101807 with U.S. Appl. No. 13/719,041.

* cited by examiner

# LEAD PLATE, BATTERY PACK HAVING THE SAME, AND METHOD OF MANUFACTURING THE BATTERY PACK

RELATED APPLICATIONS

This application claims the benefit of Korean Patent Application No. 10-2012-0101807, filed on Sep. 13, 2012, in the Korean Intellectual Property Office, the disclosure of which is incorporated herein in its entirety by reference.

BACKGROUND

1. Field

One or more embodiments of the present invention relate to lead plates for electrically connecting a plurality of batteries.

2. Description of the Related Art

Recently, portable electronic devices, such as notebook computers, tablet computers, and smart phones, have been widely used. A portable electronic device includes a battery pack that stores power so that the portable electronic device can be used for a certain period of time when the portable electronic device is separated from an external power source. The battery pack may include a plurality of battery cells formed of secondary batteries that can be repeatedly charged and discharged.

In addition, positive terminals or negative terminals of the battery cells may be combined with lead taps to permit connection of the battery.

SUMMARY

One or more embodiments of the present invention include lead plates for electrically connecting a plurality of battery cells, and methods of increasing welding ability.

Additional aspects will be set forth in part in the description which follows and, in part, will be apparent from the description, or may be learned by practice of the presented embodiments.

According to one or more embodiments of the present invention, a lead plate for electrically connecting a plurality of battery cells, the lead plate includes: a first welding unit; a second welding unit separately disposed from the first welding unit by a slit between the first and second welding units; and a by-pass unit, an end of which is connected to the first welding unit and the other end of which is connected to the second welding unit, wherein the end of the by-pass unit is disposed on an opposite side of the slit based on the first welding unit, and the other end of the by-pass unit is disposed on an opposite side of the slit based on the second welding unit.

The lead plate may include folding grooves at a connected portion between the end of the by-pass unit and the first welding unit and at a connected portion between the other end of the by-pass unit and the second welding unit.

The lead plate may further include an insulating film that exposes the first welding unit and the second welding unit to the outside and surrounds the by-pass unit.

According to one or more embodiments of the present invention, a battery pack includes: a plurality of battery cells having terminal units; and a lead plate having a first welding unit and a second welding unit that are welded to each of the battery cells, wherein the lead plate comprises a slit formed between the first welding unit and the second welding unit so that the first welding unit and the second welding unit separate apart and a by-pass unit, an end of which is connected to the first welding unit and the other end of which is connected to the second welding unit, and the end of the by-pass unit is disposed on an opposite side of the slit based on the first welding unit, and the other end of the by-pass unit is disposed on an opposite side of the slit based on the second welding unit.

According to one or more embodiments of the present invention, a method of manufacturing a battery pack that includes performing an electrical resistance welding on a plurality of battery cells and a lead plate, the method includes: preparing a lead plate that comprises a first welding unit and a second welding unit which are separately disposed by a slit between the first and second welding units; and performing an electrical resistance welding on the first welding unit and the second welding unit after contacting the first welding unit and the second welding unit of the lead plate with terminals of the battery cells, wherein the lead plate comprises a by-pass unit, an end of which is connected to the first welding unit and the other end of which is connected to the second welding unit, and the end of the by-pass unit is disposed on an opposite side of the slit based on the first welding unit, and the other end of the by-pass unit is disposed on an opposite side of the slit based on the second welding unit.

According to the lead plate according to the present invention, the welding ability of the lead plate is greatly improved, and thus, a welding failure or damage to the lead plate during welding may be effectively reduced. Accordingly, when the lead plate according to the present invention is employed in a battery pack, the stability of the battery pack may be effectively ensured.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The present invention will be described more fully with reference to the accompanying drawings, in which exemplary embodiments of the present invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those of ordinary skill in the art. It should be understood that this description has been made by way of preferred example, and that the invention is defined by the scope of the following claims. The terminologies used herein are for the purpose of describing particular embodiments only and are not intended to be limiting of the inventive concept. As used herein, the singular forms "a", "an", and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, and/or components, and/or groups thereof. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Figure 1:
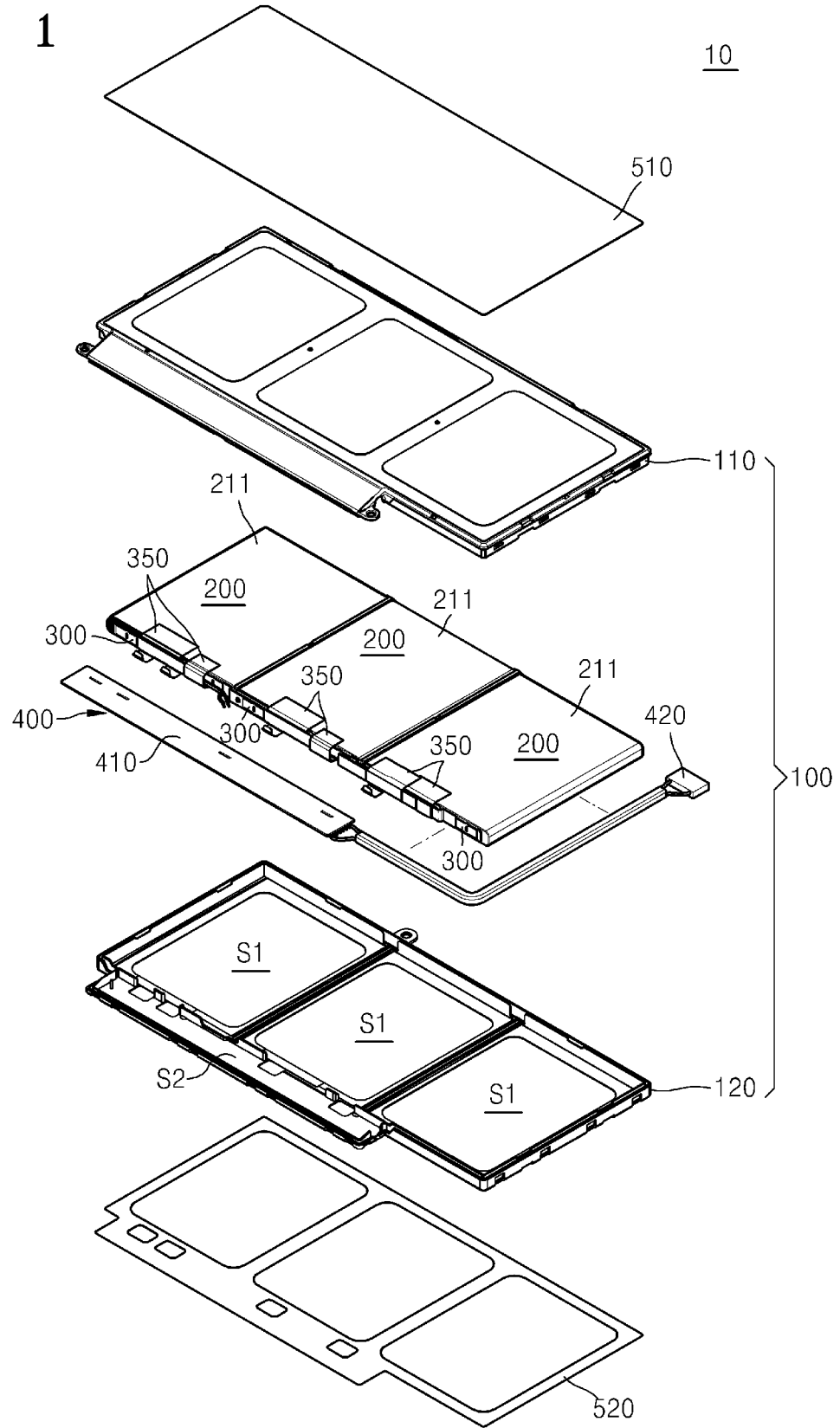
FIG. 1 is a schematic exploded perspective view showing an overall configuration of a conventional battery pack.

FIG. 1 is a schematic exploded perspective view showing an overall configuration of a conventional battery pack 10. Here, the "conventional battery pack" refers to a battery pack that has been developed by the current inventors, but does not denote a battery pack open to the public or a battery pack corresponding to a battery pack that is well known in the art.

Referring to FIG. 1, the conventional battery pack 10 includes a case 100, a plurality of battery cells 200 accommodated in the case 100, and a protection circuit module 400.

The case 100 may include the battery cells 200 and the protection circuit module 400 therein. An external cover material of the battery cells 200 that are accommodated in the case 100 may be a can 211 formed of a metal material, and at this point, in order to avoid an unnecessary electrical connection of the battery cells 200, the case 100 may include an insulating material. For example, the case 100 may be an injection molding plastic.

The case 100 may include an upper case 110 and a lower case 120. The upper case 110 and the lower case 120 may be connected to each other through a hook structure formed along laterals thereof. The lower case 120 may include a space S1 in which the battery cells 200 may sit and a space S2 in which the protection circuit module 400 may sit.

In order to minimize an overall thickness of the case 100, an upper surface of the upper case 110 corresponding to upper surfaces of the battery cells 200 or a lower surface of the lower case 120 corresponding to lower surfaces of the battery cells 200 may be formed in an opened form. An opened region of the upper case 110 and the lower case 120 may be covered by labels 510 and 520 that are respectively attached to the upper case 110 and the lower case 120.

The battery cells 200 may comprise rechargeable lithium-ion secondary batteries. Each of the battery cells 200 includes an electrode assembly (not shown) and the can 211 that accommodates the electrode assembly. The electrode assembly may be formed by winding in a jelly roll form after stacking an anode plate, a cathode plate, and a separator interposed between the anode plate and the cathode plate. The can 211 may be formed of a metal material, for example, aluminum or an aluminum alloy, but is not limited thereto.

The battery cells 200 may be arranged side-by-side along a direction. The battery cells 200 may be disposed parallel to each other so that a positive electrode and a negative electrode of each of the battery cells 200 are disposed on a front side. For example, the battery cells 200 may be connected in a series by conventional lead plates 300. The lead plates 300 may be stably combined with the battery cells 200 by a tape 350.

In the current embodiment, a single conventional battery pack 10 is formed of three battery cells 200 connected in a series. However, the number and the connection method of battery cells 200 that constitute the conventional battery pack 10 are not limited thereto, and may be configured in various ways.

The protection circuit module 400 may be electrically connected to the battery cells 200. The protection circuit module 400 may prevent the battery cells 200 from overheating or exploding due to overcharging, over-discharging, or an over-current of the battery cells 200. The protection circuit module 400 may include a substrate 410 and a protective device (not shown) mounted on a side or in the substrate 410. The protective device may be formed of a passive device, such as a resistor and a capacitor, an active device, such as an electric field transistor, or an integrated circuit.

A connector 420 for supplying power to an external electronic device may be included on a side of the protection circuit module 400.

Figure 2:
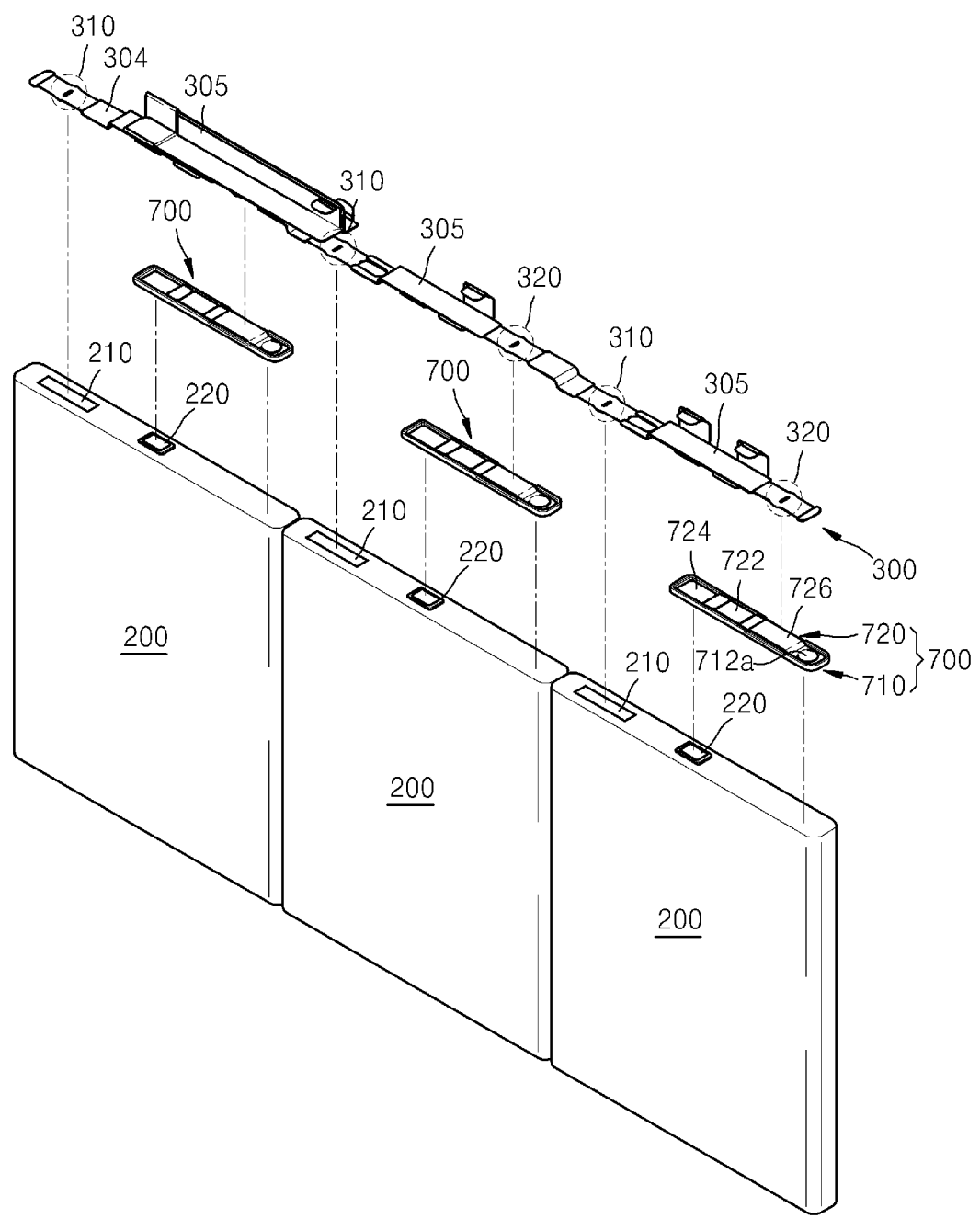
FIG. 2 is a schematic exploded perspective view showing a portion of the battery pack of FIG. 1.

FIG. 2 is a schematic exploded perspective view showing the battery cells 200, lead taps 700, and the lead plates 300 of the battery pack 200 of FIG. 1.

Referring to FIG. 2, each of the battery cells 200 includes a first terminal and a second terminal. Here, the first terminal may be a positive terminal 210 and the second terminal may be a negative terminal 220.

The lead tap 700 is connected to the negative terminal 220 of the battery cell 200 and is electrically connected to the lead plate 300. In the current embodiment, the lead tap 700 is disposed on the negative terminal 220. However, the lead tap 700 may only be disposed on the positive terminal 210 or may be disposed on both the positive terminal 210 and the negative terminal 220. Also, in the current embodiment, the lead tap 700 and the positive terminal 210 and the negative terminal 220 of the battery cell 200 are separately described. However, one of ordinary skill in the art understands that a terminal unit of the battery cell 200 includes a lead tap that is electrically connected to an electrode of a battery cell 200. That is, the positive terminal 210 of the battery cell 200 in the current embodiment may be referred to as a terminal unit, and also, a whole body in which the negative terminal 220 and a lead tap 700 that is connected to the negative terminal 220 may be referred to as a terminal unit.

The lead tap 700 includes an insulation cover 710 and an overheating block device assembly 720. The insulation cover 710 supports the overheating block device assembly 720, and is formed of an electrical insulation material, for example, a synthetic resin such as polycarbonate, polypropylene, or polyvinyl chloride. The overheating block device assembly 720 includes an overheating block device 722, a first lead 724, a second lead 726, and a combining unit 712a.

The overheating block device (or thermal cut off device) 722 cuts off power when the temperature of the conventional battery pack 10 is increased beyond a predetermined level. A thermistor that has a positive thermal coefficient may be used as the overheating block device 722. Also, the overheating block device 722 may be a commercialized overheating block fuse.

The first lead 724 may electrically connect the overheating block device 722 to the negative terminal 220 of the battery cell 200. The first lead 724 is disposed to be exposed through a lower surface of the insulation cover 710 so that the first lead 724 may be connected to the negative terminal 220 of the battery cell 200.

The second lead 726 may electrically connect the overheating block device 722 to the lead plate 300. The second lead 726 may be connected to the lead plate 300 by welding. That is, the negative terminal 220 of the battery cell 200 is electrically connected to the lead plate 300 through the first lead 724, the overheating block device 722, and the second lead 726 of the overheating block device assembly 720. Accordingly, since the overheating block device 722 cuts off power when the temperature of the battery cell 200 is increased beyond a predetermined level, an additional overheating of the battery cell 200 may be immediately and effectively blocked.

The lead plate 300 is formed to connect the battery cells 200 in series or parallel. The lead plate 300 includes a first connection unit 310 that is electrically connected to the positive terminal 210 of the battery cell 200 and a second connection unit 320 that is electrically connected to the second lead 726 of the lead tap 700 that is connected to the negative terminal 220 of the battery cell 200. The connection of the first connection unit 310 of the lead plate 300 to the positive terminal 210 of the battery cell 200, and the connection of the second connection unit 320 of the lead plate 300 to the second lead 726 of the lead tap 700 may be achieved by welding. The lead plate 300 may include a conductive plate 304 that is formed of a conductive material and includes the first connection unit 310 and the second connection unit 320 and an insulating film 305 that surrounds portions of the conductive plate 304 and not the first connection unit 310 and the second connection unit 320. The insulating film 305 is not disposed on the first connection unit 310 and the second connection unit 320 of the conductive plate 304 so that the first connection unit 310 and the second connection unit 320 of the lead plate 300 are exposed to the outside.

Figure 3:
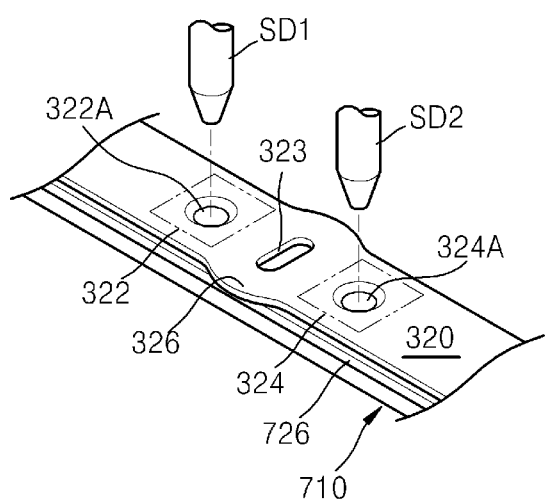
FIG. 3 is a schematic perspective view for explaining a method of welding a second connection unit of a lead plate and a second lead of a lead tap.

FIG. 3 is a schematic perspective view for explaining a method of welding the second connection unit 320 of the conventional lead plate 300 and the second lead 726 of the lead tap 700. Hereinafter, the method of welding the second connection unit 320 of the lead plate 300 and the second lead 726 of the lead tap 700 is mainly described. However, a method of welding the first connection unit 310 of the lead plate 300 and the positive terminal 210 of the battery cell 200 is substantially the same as the above welding method except that the first connection unit 310 of the lead plate 300 and the positive terminal 210 of the battery cell 200 are welded without interposing an additional lead tap 700 therebetween. Therefore, the method described below may be effectively applied to the method of welding the first connection unit 310 of the lead plate 300 and the positive terminal 210 of the battery cell 200. Accordingly, the description of the method of welding the first connection unit 310 of the lead plate 300 and the positive terminal 210 of the battery cell 200 is omitted.

Referring to FIG. 3, the second connection unit 320 of the conventional lead plate 300 includes a first welding unit 322, a second welding unit 324, and a connection unit 326. The first welding unit 322 includes a concave lead-in unit 322A. A lower surface the lead-in unit 322A protrudes downwards and contacts the second lead 726 of the lead tap 700 that is located below the first welding unit 322. An upper surface of the lead-in unit 322A of the first welding unit 322 contacts a first electrode SD1, for example, a positive electrode of an electrical resistance welding apparatus. The second welding unit 324 is separated from the first welding unit 322 with a slit 323 therebetween. The second welding unit 324 includes a lead-in unit 324A, like the first welding unit 322. The lead-in unit 324A of the second welding unit 324 contacts a second electrode SD2, for example, a negative electrode of the electrical resistance welding apparatus, and a lower surface of the lead-in unit 324A contacts the second lead 726 of the lead tap 700. The connection unit 326 combines the first welding unit 322 and the second welding unit 324 so that the first welding unit 322 and the second welding unit 324 are not completely separated. The connection unit 326 is disposed between the first welding unit 322 and the second welding unit 324, and is disposed outside the slit 323.

Figure 4:
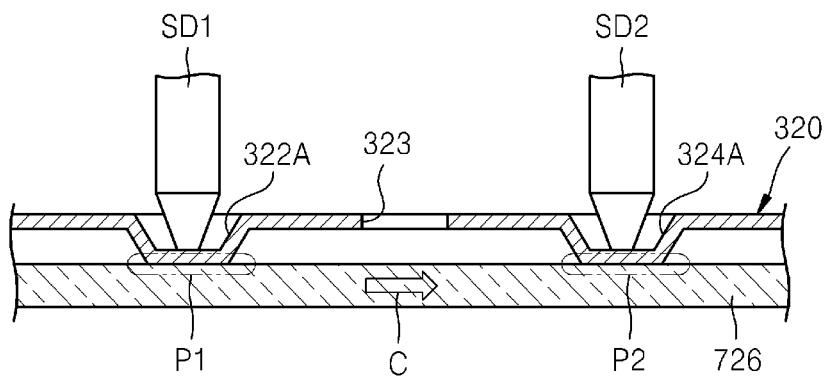
FIG. 4 is a schematic cross-sectional view of the second lead of the lead tap and the lead plate to describe the method of welding the second connection unit of the lead plate and the second lead of the lead tap.

FIG. 4 is a schematic cross-sectional view of the second lead 726 of the lead tap 700 and the lead plate 300 to describe the method of welding the second connection unit 320 of the lead plate 300 and the second lead 726 of the lead tap 700. Referring to FIG. 4, after the lead-in unit 322A of the first welding unit 322 and the lead-in unit 324A of the second welding unit 324 respectively contact with the first electrode SD1 and the second electrode SD2 of the electrical resistance welding apparatus, when a high voltage is applied between the first electrode SD1 and the second electrode SD2, a current C flows through a path that includes the first electrode SD1 of the electrical resistance welding apparatus, an interface P1 between the first welding unit 322 and the second lead 726 of the lead tap 700, the second lead 726 of the lead tap 700, an interface P2 between the second welding unit 324 and the second lead 726 of the lead tap 700, and the second electrode SD2. At this point, a large amount of heat is generated due to a large resistance at the interface P1 between the first welding unit 322 and the second lead 726 of the lead tap 700 and the interface P2 between the second welding unit 324 and the second lead 726 of the lead tap 700, and the first welding unit 322 and the second welding unit 324 are welded to the second lead 726 of the lead tap 700 by the heat.

Figure 5:
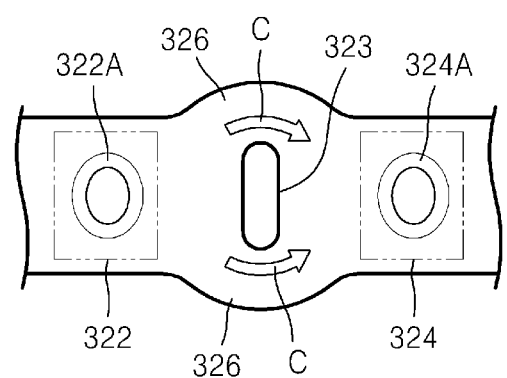
FIG. 5 is a schematic plan view of the second connection unit to describe a path of a leakage current.

When an electrical resistance welding is performed, a current that flows in the first electrode SD1 and the second electrode SD2 may flow along a path besides the path indicated by the arrow of FIG. 4. FIG. 5 is a schematic plan view of the second connection unit 320 to describe a path of a leakage current. As depicted in FIG. 5, when an electrical resistance welding is performed, a current applied to the second connection unit 320 may directly flow from the first welding unit 322 to the second welding unit 324 through the connection unit 326 without flowing through the interfaces P1 and P2 between the second connection unit 320 of the conventional lead plate 300 and the second lead 726 of the lead tap 700. In this way, the current C that leaks through the connection unit 326 without flowing through the interfaces P1 and P2 may reduce welding ability, may cause a breakage of the connection unit 326, or may cause a problem of generating soot. These problems eventually may lead to the failure of the conventional battery pack 10 and reduce yield.

As a method of addressing the problems of the conventional battery pack 10 and the lead plate 300 included in the conventional battery pack 10 described above, the present invention provides a new type of lead plate. The new type of the lead plate may be employed in the conventional battery pack 10, instead of the conventional lead plate 300.

Figure 6:
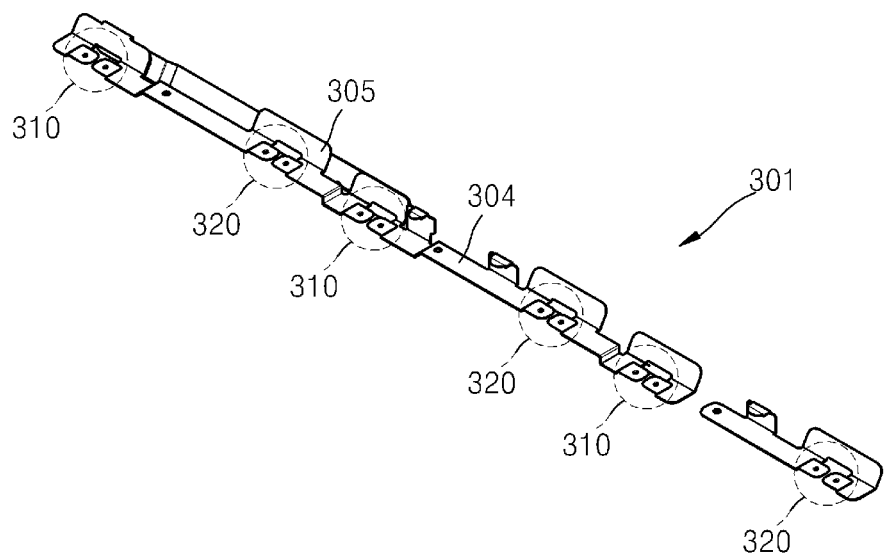
FIG. 6 is a schematic perspective view of a lead plate according to an embodiment of the present invention.

FIG. 6 is a schematic perspective view of a lead plate 301 according to an embodiment of the present invention. Referring to FIG. 6, the lead plate 301 according to the current embodiment includes a conductive plate 304 that includes a first connection unit 310 and a second connection unit 320, and an insulating film 305 that covers a surface of the conductive plate 304 but exposes a welding point of the first connection unit 310 and the second connection unit 320 of the conductive plate 304, wherein the conductive plate 304 is formed of an electrical conductive material, for example, a tin-plated copper material.

Figure 7:
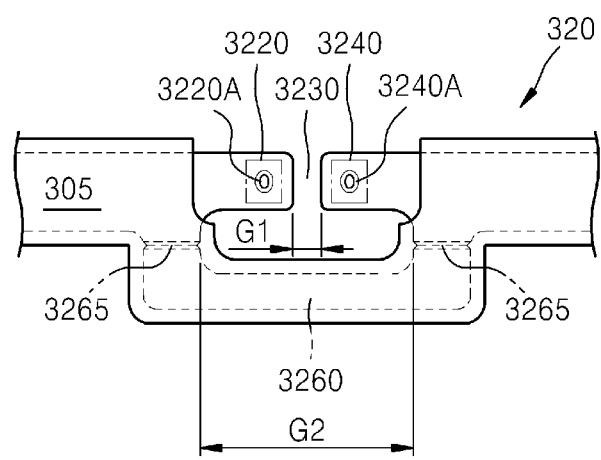
FIG. 7 is a schematic plan view of the second connection unit of the lead plate of FIG. 6.

FIG. 7 is a schematic plan view of the second connection unit 320 of the lead plate 301 of FIG. 6. Referring to FIG. 7, the second connection unit 320 of the lead plate 301 according to the current embodiment includes a first welding unit 3220, a second welding unit 3240, and a by-pass unit 3260.

The first welding unit 3220 includes a concave lead-in unit 3220A, and a lower surface of the first welding unit 3220 opposite to the lead-in unit 3220A extends downwards and contacts the second lead 726 of the lead tap 700 that is located below the first welding unit 3220. An upper surface of the lead-in unit 3220A of the first welding unit 3220 contacts a first electrode, for example, a positive electrode of an electrical resistance welding apparatus.

The second welding unit 3240 is separated from the first welding unit 3220 by a slit 3230 therebetween. The second welding unit 3240 includes a lead-in unit 3240A, like the first welding unit 3220. An upper surface of the lead-in unit 3240A of the second welding unit 3240 contacts a second electrode, for example, a negative electrode of the electrical resistance welding apparatus, and a lower surface of the lead-in unit 3240A contacts the second lead 726 of the lead tap 700.

An end of the by-pass unit 3260 is connected to the first welding unit 3220, and the other end thereof is connected to the second welding unit 3240. That is, an end of the by-pass unit 3260 is disposed on an opposite side to the slit 3230 based on the first welding unit 3220, and the other end of the by-pass unit 3260 is disposed on an opposite side to the slit 3230 based on the second welding unit 3240. The by-pass unit 3260 connects the first welding unit 3220 and the second welding unit 3240 to each other so as not to be completely separated from each other. The by-pass unit 3260 may include folding grooves 3265 at a connection portion between the by-pass unit 3260 and the first welding unit 3220 and a connection portion between the by-pass unit 3260 and the second welding unit 3240 so that the by-pass unit 3260 is easily folded with respect to the conductive plate 304. The by-pass unit 3260 may be surrounded by the insulating film 305. In the present invention, a gap G1 between the first welding unit 3220 and the second welding unit 3240 are smaller than a gap G2 between the end of the by-pass unit 3260 and the other end of the by-pass unit 3260.

Figure 8:
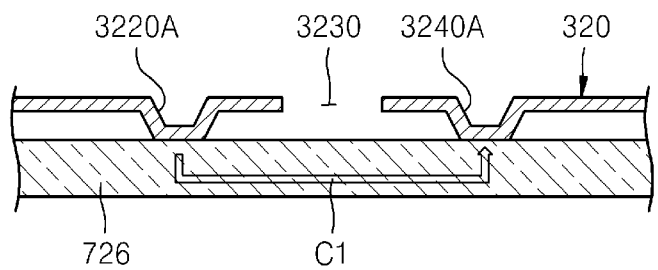
FIG. 8 is a schematic cross-sectional view of the second lead of the lead tap and the lead plate to describe a method of welding the second connection unit of the lead plate and the second lead of the lead tap.

FIG. 8 is a schematic cross-sectional view of the second lead 726 of the lead tap 700 and the lead plate 301 to describe a method of welding the second connection unit 320 of the lead plate 301 and the second lead 726 of the lead tap 700. Referring to FIG. 8, after the first electrode and the second electrode of the electrical resistance welding apparatus respectively contact with the lead-in unit 3220A of the first welding unit 3220 and the lead-in unit 3240A of the second welding unit 3240, when a high voltage is applied between the first electrode and the second electrode, a current flows through a path C1 that includes the first electrode of the electrical resistance welding apparatus, an interface between the first welding unit 3220 and the second lead 726 of the lead tap 700, the second lead 726 of the lead tap 700, an interface between the second welding unit 3240 and the second lead 726 of the lead tap 700, and the second electrode. At this point, welding is performed at the interface between the first welding unit 3220 and the second lead 726 of the lead tap 700 and the interface between the second welding unit 3240 and the second lead 726 of the lead tap 700.

Figure 9:
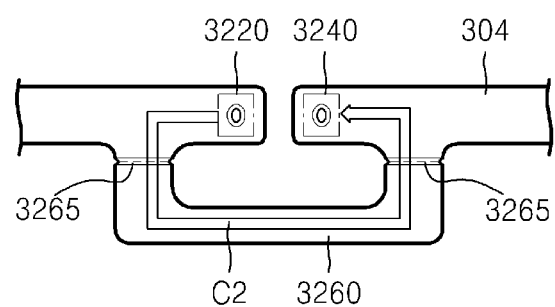
FIG. 9 is a schematic plan view of the second connection unit to describe a path of a leakage current.

When an electrical resistance welding is performed, a current that flows from the first electrode and the second electrode of the electrical resistance welding apparatus may flow through the by-pass unit 3260 besides the path C1 indicated by an arrow. FIG. 9 is a schematic plan view of the second connection unit 320 to describe a path of a leakage current. As depicted in FIG. 9, when an electrical resistance welding is performed, some of the current applied to the second connection unit 320 may directly flow from the first welding unit 3220 to the second welding unit 3240 through the connection unit 3260 without flowing through the interface between the second connection unit 320 and the second lead 726 of the lead tap 700. However, a path of a leakage current formed by the by-pass unit 3260 is longer than that of a leakage current formed by the connection unit 326 of the conventional lead plate 300.

Accordingly, the by-pass unit 3260 according to the current embodiment overall has an greater resistance than the connection unit 326 of the conventional lead plate 300, and thus, the magnitude of the leakage current that passes the by-pass unit 3260 is reduced. Accordingly, the welding ability at the interface between the first welding unit 3220 and the second welding unit 3240 and the second lead 726 of the lead tap 700 may further be increased. Also, as the leakage current is reduced, a width of the by-pass unit 3260 may be greater than that of the connection unit 326 of the conventional lead plate 300, and thus, the density of the leakage current that flows through a cross-section of the by-pass unit 3260 is reduced. Therefore, the by-pass unit 3260 according to the current embodiment may effectively reduce breakage or soot due to a leakage current.

In the above descriptions, the welding of the second connection unit 320 of the lead plate 301 is mainly described. However, the case of the first connection unit 310 is similar to that of the second connection unit 320 except that the first connection unit 310 is directly welded to the positive terminal 210 of the battery cell 200, and thus, the same description applies to the first connection unit 310.

As described above, when an electrical resistance welding is performed by using the lead plate 301 according to the current embodiment, the welding ability between a plurality of terminals of battery cells and the lead plate 301 may be increased, and damage to the lead plate 301 due to welding may be effectively reduced. Accordingly, the conventional battery pack 10 that includes the lead plate 301 may have an increased reliability, and may have a reduced failure rate, and thus, the yield of manufacturing batteries may be increased.

According to the lead plate according to the above embodiment, the welding ability of the lead plate is greatly improved, and thus, a welding failure or damage to the lead plate during welding may be effectively reduced. Accordingly, when the lead plate according to the above embodiment is employed in a battery pack, the stability of the battery pack may be effectively ensured.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:
1. A lead plate for electrically connecting a plurality of battery cells, the lead plate comprising:
  a first welding unit that has a width extending in a first direction and a length extending in a second direction;
  a second welding unit separately disposed from the first welding unit by a slit between the first and second welding units wherein the second welding unit has a width extending in the first direction and a length extending in the second direction and wherein the length of the second welding unit is aligned with the length of the first welding unit; and a by-pass unit, first end of which is connected to the first welding unit and a second end of which is connected to the second welding unit, wherein the first end of the by-pass unit is disposed on an opposite side of the slit based on the first welding unit, and the second end of the by-pass unit is disposed on an opposite side of the slit based on the second welding unit and wherein the by-pass unit has a length portion that extends in the first direction that is offset from the aligned lengths of the first and second welding units such that a gap is formed between the length portion of the by-pass unit and the first and second welding units and wherein the gap is extends in the first direction a greater distance than the slit.

2. The lead plate of claim 1, wherein folding grooves are formed at a connected portion between the first end of the by-pass unit and the first welding unit and at a connected portion between the second end of the by-pass unit and the second welding unit.

3. The lead plate of claim 1, further comprising an insulating film that exposes the first welding unit and the second welding unit and surrounds the by-pass unit.

4. The lead plate of claim 1, wherein the by-pass unit defines a leakage current path that is higher resistance than a direct current path between the first and second welding units.

5. The lead plate of claim 1, wherein the slit is formed between two edges of the by-pass unit to increase the current path resistance.

6. The lead plate of claim 1, wherein the slit is formed at one edge of the by-pass unit and extends inward.

7. A battery pack comprising:

a plurality of battery cells having terminal units; and a lead plate having a first welding unit and a second welding unit that are welded to each of the battery cells, wherein the lead plate comprises a slit formed between the first welding unit and the second welding unit so that the first welding unit and the second welding unit separate apart and a by-pass unit, a first end of which is connected to the first welding unit and a second end of which is connected to the second welding unit, and the end of the by-pass unit is disposed on an opposite side of the slit based on the first welding unit, and the other end of the by-pass unit is disposed on an opposite side of the slit based on the second welding unit wherein the first welding unit that has a width extending in a first direction and a length extending in a second direction;

wherein the second welding unit has a width extending in the first direction and a length extending in the second direction and wherein the length of the second welding unit is aligned with the length of the first welding unit; and wherein the by-pass unit has a length portion that extends in the first direction that is offset from the aligned lengths of the first and second welding units such that a gap is formed between the length portion of the by-pass unit and the first and second welding units and wherein the gap is extends in the first direction a greater distance than the slit.

8. The battery pack of claim 7, wherein the lead plate comprises folding grooves at a connected portion between the first end of the by-pass unit and the first welding unit and at a connected portion between the second end of the by-pass unit and the second welding unit.

9. The battery pack of claim 7, wherein the lead plate further comprises an insulating film that exposes the first welding unit and the second welding unit and surrounds the by-pass unit.

10. The battery pack of claim 7, wherein the by-pass unit defines a leakage current path that is higher resistance than a direct current path between the first and second welding units.

11. The battery pack of claim 7, wherein the slit is formed between two edges of the by-pass unit to increase the current path resistance.

12. The battery pack of claim 7, wherein the slit is formed at one edge of the by-pass unit and extends inward.

* * * * *